US010368695B2

(12) United States Patent
Shanmugam

(10) Patent No.: US 10,368,695 B2
(45) Date of Patent: Aug. 6, 2019

(54) VESSELS FOR PROCESSING AND STORAGE OF FOODSTUFFS

(71) Applicant: Sivaprakash Shanmugam, Havant (GB)

(72) Inventor: Sivaprakash Shanmugam, Havant (GB)

(73) Assignee: KENWOOD LIMITED, Havant, Hampshire (GB)

( * ) Notice: Subject to any disclaimer, the term of this patent is extended or adjusted under 35 U.S.C. 154(b) by 482 days.

(21) Appl. No.: 15/038,835

(22) PCT Filed: Nov. 24, 2014

(86) PCT No.: PCT/GB2014/053462
§ 371 (c)(1),
(2) Date: May 24, 2016

(87) PCT Pub. No.: WO2015/075476
PCT Pub. Date: May 28, 2015

(65) Prior Publication Data
US 2016/0353934 A1 Dec. 8, 2016

(30) Foreign Application Priority Data
Nov. 25, 2013 (GB) .................................. 1320731.1

(51) Int. Cl.
*A47J 43/07* (2006.01)
*G02F 1/137* (2006.01)

(52) U.S. Cl.
CPC .......... *A47J 43/0727* (2013.01); *G02F 1/137* (2013.01); *G02F 2001/13756* (2013.01)

(58) Field of Classification Search
CPC ............................. Y10S 428/917; A47J 43/046
(Continued)

(56) References Cited

U.S. PATENT DOCUMENTS 5,589,958 A 12/1996 Lieb
6,118,572 A 9/2000 Kostecki et al.
(Continued)

FOREIGN PATENT DOCUMENTS

GB 2423463 A * 8/2006 ............ A47J 27/212
JP H07198245 A 8/1995
(Continued)

OTHER PUBLICATIONS

International Search Report and Written Opinion of the International Searching Authority for PCT/GB2014/053462, dated Mar. 18, 2015; ISA/EP.
(Continued)

*Primary Examiner* — Shelley M Self
*Assistant Examiner* — Katie L. Parr
(74) *Attorney, Agent, or Firm* — Harness, Dickey & Pierce, P.L.C.

(57) ABSTRACT

A combination of a container in which foodstuffs are to be prepared and stored, and an electrically powered food-processing appliance, wherein at least a portion of the container includes material responsive to electrical energy applied thereto to vary the transmission of light therethrough. The appliance is configured for selectively applying electrical energy to the material, whereby at least said portion of said container is selectively rendered more transmissive to light.

6 Claims, 2 Drawing Sheets

Figure 1:
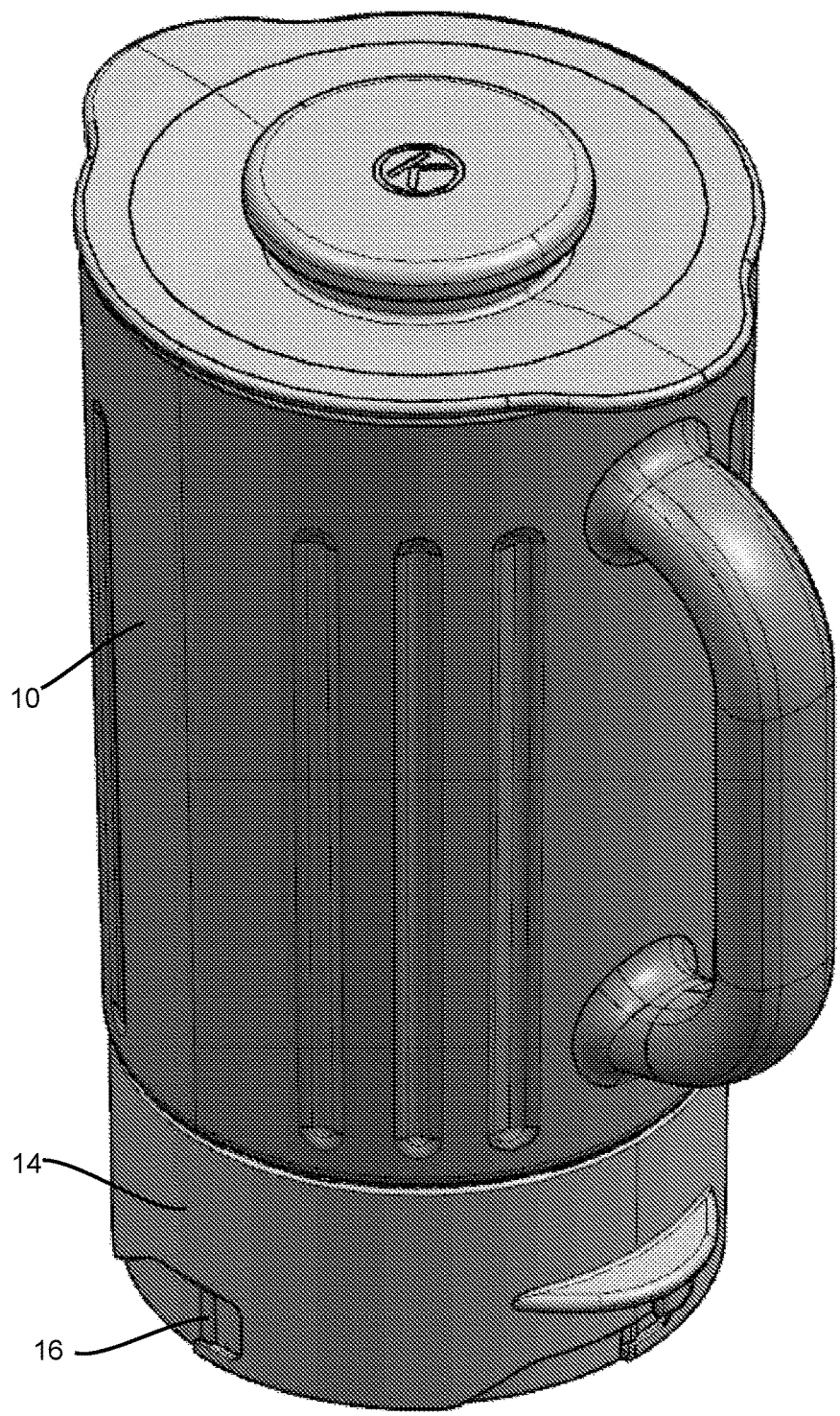

(58) Field of Classification Search
USPC .......................................................... 428/917
See application file for complete search history.

(56) References Cited

U.S. PATENT DOCUMENTS

| | | | |
|---|---|---|---|
| 9,750,390 B2* | 9/2017 | Flores | A47L 15/4257 |
| 2002/0110654 A1* | 8/2002 | Cook | B32B 27/18 |
| | | | 428/34.7 |
| 2006/0081639 A1 | 4/2006 | Lazaroff et al. | |
| 2008/0098905 A1 | 5/2008 | Steiner et al. | |
| 2012/0024993 A1* | 2/2012 | Audette | A47J 43/0777 |
| | | | 241/30 |
| 2012/0106139 A1 | 5/2012 | Ewald et al. | |

FOREIGN PATENT DOCUMENTS

| | | |
|---|---|---|
| WO | WO-2008155538 A2 | 12/2008 |
| WO | WO-2011003915 A1 | 1/2011 |

OTHER PUBLICATIONS

Search Report of the Great Britain Priority Application No. 1320731.1 dated May 6, 2014.

\* cited by examiner

VESSELS FOR PROCESSING AND STORAGE OF FOODSTUFFS

CROSS-REFERENCE TO RELATED APPLICATIONS

This application is a 371 U. S. National Stage of International Application No. PCT/GB2014/053462, filed on Nov. 24, 2014 and claims priority to Great Britain Application No. 1320731.1, filed on Nov. 25, 2013. The entire disclosures of the above applications are incorporated herein by reference.

This invention relates to vessels, such as bowls or jars, in which foodstuffs can be both subjected to food-processing operations and stored.

It is known, from WO-A1-2011/003915 (the full disclosure of which is hereby incorporated herein by reference), that the degree of transparency of (inter alia) certain containers can be temporarily changed, by means of an electro-optically switchable system using the so-called electrochromic or photoelectrochromic principle, to selectively control the amount of light that can enter the packaging or container and fall upon the contents thereof. The system comprises an optically active element, incorporated into the container, and a switch for selectively applying electrical power to the element. In some of the described embodiments, the element is normally opaque, or at least partially opaque, but is switched into a more transparent state for so long as the electrical power is applied to it via the switch.

It is also known that various characteristics of many foodstuffs can be adversely affected by exposure to light, especially if such exposure is protracted, and thus there is incentive to store foodstuffs in opaque containers, or at least in containers which exhibit limited transmissibility to light.

Difficulties arise, however, when it is necessary and/or convenient to prepare foodstuffs in a container in which they are to be stored, since it is desirable and, in some circumstances, necessary to observe the foodstuffs during preparation.

The present invention aims to reduce the aforementioned difficulty and, according to the invention there is provided in combination a container in which foodstuffs are to be prepared and stored, and an electrically powered food-processing appliance, wherein at least a portion of the container comprises material responsive to a condition of electrical energy applied thereto to vary the transmission of light therethrough and the appliance comprises means for selectively applying (preferably, the means comprising an input or switch for selectively applying) said electrical energy to said container, whereby at least said portion of said container is selectively rendered more transmissive to light.

Preferably, the container is configured to dock with the appliance and the appliance comprises means for automatically applying (preferably, the means comprising a system for automatically applying) said electrical energy to said material of the container when the container is docked therewith.

In some embodiments, the means for applying (preferably, selectively or automatically) said electrical energy to said material of the container includes switchable means (preferably, such as a switch), which may be automatically actuated by the docking procedure, or manually controllable by a user of the appliance.

In all embodiments of the invention, the container preferably comprises means to accommodate and drive in rotation a food processing tool (preferably, the means comprises an aperture or coupling for a food processing tool), such as blades or other devices.

Preferably, said material is a liquid crystalline material and means are provided to display information thereon as an LCD.

The invention extends to a container and electrically powered food-processing appliance, substantially as herein described with reference to and/or as shown in the accompanying drawings.

The invention extends to methods and/or apparatus substantially as herein described with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Figure 2:
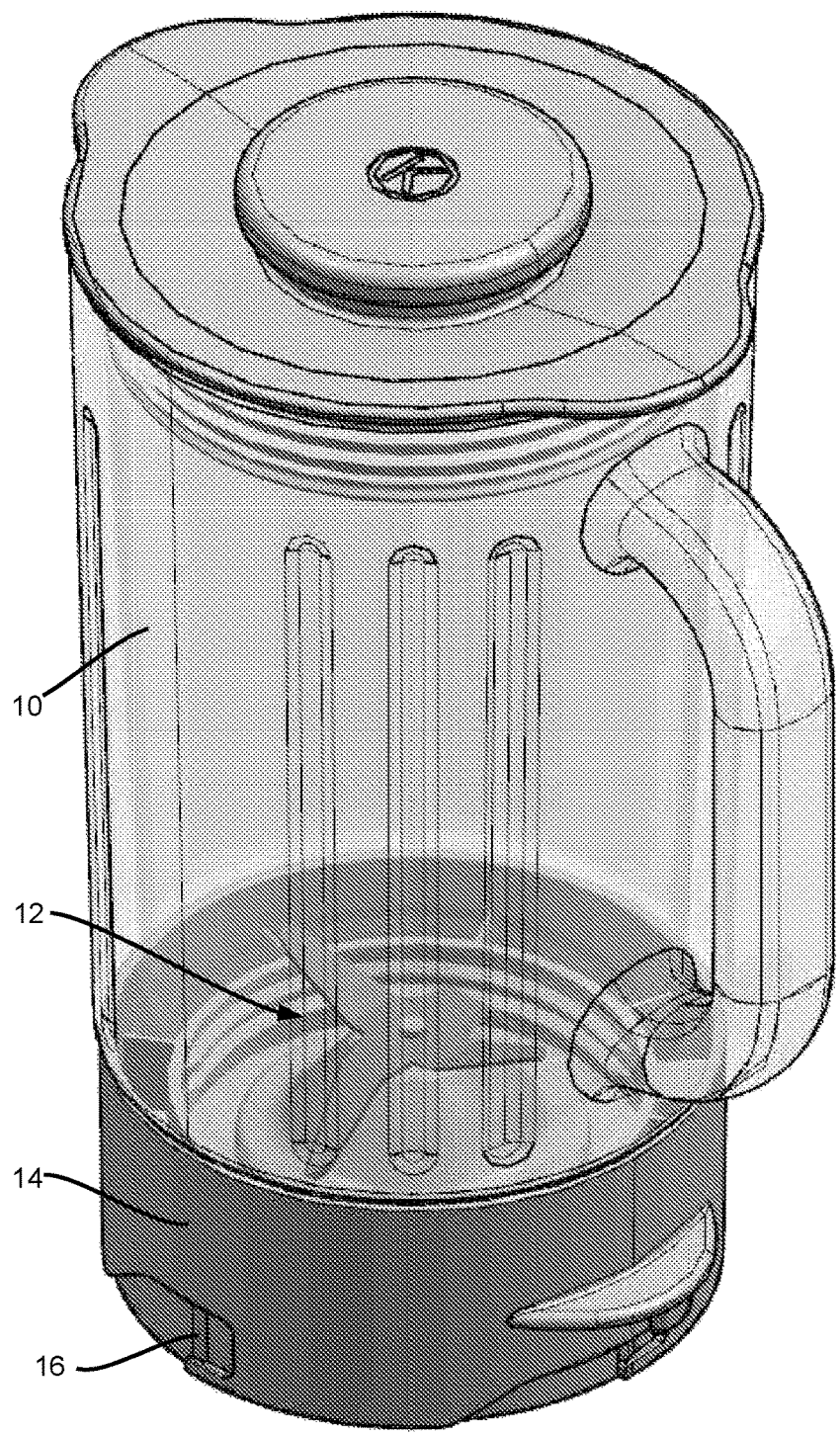

In order that the invention may be clearly understood and readily carried into effect, one embodiment thereof will now be described, by way of example only, with reference to the accompanying drawings, of which:

FIG. 1 shows in an opaque state a goblet, or jug, suitable for use in combination with a food-processing appliance in a combination according to one embodiment of the invention; and FIG. 2 shows the goblet of FIG. 1 in a more transparent state.

As explained in the aforementioned WO-A1-2011/003915, the mechanical, chemical and/or aesthetic properties of materials, such as foodstuffs, are vulnerable to impairment under prolonged exposure to various agencies, including light. Depending on the nature of the materials in question, and the extent and intensity of their illumination, the adverse change can be manifested in various ways, such as discoloration and/or impairment of taste and/or smell and, in the case of foodstuffs in particular, such degradation can considerably reduce their shelf-life.

Accordingly, if foodstuffs are stored in transparent containers, such as jars, their quality may be degraded by exposure to light, so it is preferable to store foodstuffs in opaque containers, or at least in containers which admit light only to a limited extent. On the other hand, it is sometimes convenient to prepare foodstuffs by processing them in a container in which they are to be stored. In such circumstances, the use of opaque or partially opaque containers is inconvenient, since it does not permit the ready observation of the foodstuffs during the processing operation. It will be appreciated that the observation of foodstuffs during processing is important, as it enables the progress of the processing to be observed, and thus allows the user to make decisions about the processing, for example to judge when to stop processing and/or when to add further ingredients, etc.

Accordingly, the invention provides for the use of an optical switching system, based upon the principles set forth in the above-mentioned WO publication, whereby part at least of a substantially opaque container can be temporarily converted, when used as a food-processing container, into a state that admits sufficient light to permit user-observation of the foodstuffs being processed.

In this example, the container is in the form of a blender goblet, or jug, 10 made of glass with an electro-chromatic coating thereon and which is normally opaque, as shown in FIG. 1. By the application of electrical energy, however, the coating can be energised, thereby temporarily rendering the jug 10 transparent, or at least sufficiently so to enable a user to see what is going on inside the jug.

This condition is shown in FIG. 2, where it can be seen that a food-processing tool in the form of a blade system 12 is provided in the jug 10 and near its base 14; the blade assembly 12 being drivable in rotation by means of a sealed, "through-the-base" drive coupling of well-known kind which picks up rotational drive from a drive outlet (not shown) of a food processor when the goblet 10 is operationally mounted to, i.e. docked with, the food processor.

In this embodiment, the food processor mounting to which the goblet is docked is configured to actuate a switch 16 at the base of the jug 10 when the jug 10 is operationally docked with the food processor. The actuation of the switch 16 is effective to electrically energise, in any convenient manner, the electro-chromatic coating on the jug 10 and so automatically render at least part of the jug 10 sufficiently transparent for as long as the switch 16 remains in its actuated state, thereby allowing a user of the appliance to observe the progress of the food-processing operation.

It will be appreciated that the switch 16 can be used to electrically energise the coating on the jug 10 from a battery or other power source on board the jug 10, or to derive the necessary electrical power from the food-processor appliance, via voltage transformation and regulating circuitry, as needed, and a suitable contact arrangement.

By this means, the invention provides an automatic electro-optically switchable system, responsive to the engagement and disengagement of the jug 10 from the food-processor, such that during processing, when it is necessary for a user to observe the foodstuff, the jug 10, or at least a part thereof, admits light, whereas at other times, and particularly whilst the already-processed foodstuff is stored, the jug 10 is substantially opaque.

In this particular embodiment, the coating extends over the entire surface area of the jug 10, but this need not necessarily be the case, and the coating may be applied only in one or more selected "window" areas.

In other embodiments of the invention, some or all of the jug 10 can be made of panels of electrochromic or photo-electrochromic material.

If suitable electrochromic or photoelectrochromic materials, for example those incorporating liquid crystals, are employed, they can additionally function as a display (LCD); this makes it possible to impart information visually, for example to provide operational details about speed, temperature, processing time etc.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. The combination comprising:
a container in which foodstuffs are to be prepared and stored, and an electrically powered food-processing appliance,
at least a portion of the container includes material responsive to electrical energy applied thereto to vary the transmission of light therethrough; the appliance
is configured for selectively applying electrical energy to said material of the container, whereby at least said portion of said container is selectively rendered more transmissive to light so that a user can view preparation of the foodstuffs, with the material of the container returning to an opaque state after use of the food-processing appliance so that the foodstuffs can be stored in the while resisting spoilage; wherein the container is configured to dock with the food-processing appliance; and wherein the container incorporates a switch for selectively applying said electrical energy to said material, and the food-processing appliance is configured to actuate the switch.

2. The combination of claim 1, wherein said food-processing appliance is configured for automatically actuating said switch in response to a docking of said container with said food-processing appliance.

3. The combination of claim 1, wherein actuation of said switch is manually controllable by a user of the food-processing appliance.

4. The combination of claim 1, wherein the container accommodates a food processing tool that is configured to be driven in rotation from a drive on said food-processing appliance.

5. The combination of claim 1, wherein said material is a liquid crystalline material that is configured to display information on the container.

6. Apparatus comprising:
a container in which foodstuffs are to be prepared and stored;
an electrically powered food-processing appliance, the container being removably dockable in the appliance;
at least a portion of the container including material responsive to electrical energy applied thereto to vary the transmission of light therethrough, the material being substantially opaque without energy being applied thereto and being transmissive of light when energy is applied thereto;
a switch;
the appliance being configured for applying the energy to said material of the container through the switch when the container is docked with the food-processing appliance, whereby at least said portion of said container is selectively rendered more transmissive to light so that a user can view preparation of the foodstuffs, with the material of the container returning to an substantially opaque state when said container is un-docked from said food-processing appliance so that the foodstuffs can be stored in the container while resisting spoilage.

* * * * *